UNITED STATES PATENT OFFICE.

ARTHUR WEINBERG, OF FRANKFORT-ON-THE-MAIN, GERMANY, ASSIGNOR TO LEOPOLD CASSELLA & CO., OF FRANKFORT-ON-THE-MAIN, GERMANY.

BLUE WOOL-DYE AND PROCESS OF MAKING SAME.

SPECIFICATION forming part of Letters Patent No. 718,181, dated January 13, 1903.

Application filed June 27, 1902. Serial No. 113,511. (Specimens.)

*To all whom it may concern:*

Be it known that I, ARTHUR WEINBERG, a citizen of Prussia, and a resident of Frankfort-on-the-Main, in the Province of Hesse-Nassau, Kingdom of Prussia, Germany, have invented a certain new and useful Blue Wool-Dye and Process of Making Same, of which the following is a specification.

I have found that by combining p. diazoacetylalkylanilin with the sulfonic acids of the 1.8.dioxynaphthalene and by subsequent saponification of the thus-produced azo bodies new wool-dyestuffs are obtained which are distinguished for their pure-blue shades and great fastness to light.

The process is illustrated by the following example:

Example: 17.8 kilos paraämidoacetylethylanilin are diazotized with thirty-five kilos hydrochloric acid and 6.9 kilos nitrite of soda, and the diazo solution is introduced at 5° centigrade into the solution of thirty-two kilos 1.8.dioxynaphthalene 3.6.disulfonic acid in presence of a sufficient quantity of acetate of soda. After some hours the temperature is raised to 50° centigrade and the dyestuff salted out. In order to saponify the acetyl group, the dyestuff is dissolved in twelve hundred liters of a caustic-soda lye of five per cent. and the solution is boiled for about one hour. The free lye is then neutralized with hydrochloric acid and the dyestuff salted out from the pure-blue colored solution.

Having thus described my invention and in what manner it may be carried out, what I claim is—

1. The process of producing blue coloring-matters by combining paradiazoacetylalkylanilin with the sulfo-acids of 1.8.dioxynaphthalene and saponifying the thus-obtained product substantially as described.

2. The blue coloring-matter of the constitution $$\text{Alk}-\text{NH}-\text{C}_6\text{H}_4-\text{N}=\text{N}-\text{C}_{10}\text{H}_5(\text{SO}_3\text{Na})_2(\text{OH})_2$$

which is a dark bronzy powder easily soluble in water with a reddish-blue color, dissolving in diluted soda lye with a bluish-red color, in diluted acid with a scarlet color, in concentrated sulfuric acid with a reddish-violet color, and dyeing wool fast blue shades substantially as described.

Signed at Frankfort-on-the-Main, in the Province of Hesse-Nassau, Kingdom of Prussia, Germany, this 31st day of May, A. D. 1902.

ARTHUR WEINBERG.

Witnesses:
 JEAN GRUND,
 CARL GRUND.